May 7, 1935. C. F. JENKINS Re. 19,561

PICTURE TRANSMISSION

Original Filed Aug. 19, 1926 2 Sheets-Sheet 1

Inventor
CHARLES FRANCIS JENKINS
By Paul Carpenter
Attorney

May 7, 1935. C. F. JENKINS Re. 19,561

PICTURE TRANSMISSION

Original Filed Aug. 19, 1926 2 Sheets-Sheet 2

Inventor

CHARLES FRANCIS JENKINS

By Paul Carpenter

Attorney

Reissued May 7, 1935 Re. 19,561

UNITED STATES PATENT OFFICE 19,561

PICTURE TRANSMISSION

Charles Francis Jenkins, Washington, D. C., assignor, by mesne assignments, to Radio Corporation of America, a corporation of Delaware Original No. 1,693,508, dated November 27, 1928, Serial No. 130,282, August 19, 1926. Application for reissue July 30, 1930, Serial No. 471,860

5 Claims. (Cl. 178—69.5)

My invention relates to means and methods for electrically transmitting and receiving pictures between distant points. By the term "pictures" I intend to include views of natural objects, photographs, visible records, and any visible representation of intelligence.

My invention contemplates the transmission of what is known as "still" or "fixed" pictures, such as photographs, drawings, a written message or printed matter. It also contemplates the successive transmission of a series of "fixed" or "still" pictures varying slightly from each other, such as the pictures which comprise a moving picture film.

My invention further contemplates the transmission of continuously changing views of natural objects in motion, either animate or inanimate, at a rate to obtain persistence of vision.

My invention operates upon the principle of scanning successively the elementary portions of the picture or visual representation of the object to be transmitted, translating the light variations of the elementary portions into like electrical variations, transmitting these electrical variations to the distant receiving station, translating the electrical variations into like light variations, and recomposing the picture at the receiving station by distributing the light variations over a receiving surface in the same spatial relation as occupied by the elementary portions of the picture of the object. In transmitting views of moving objects the apparatus transmits and receives 10 or more, preferably 16, complete pictures per second to obtain persistence of vision.

An object of my invention is to provide a system of transmitting pictures in which a single carrier wave is employed to transmit both the light variations of the successive elementary picture portions and suitable synchronizing signals.

The above object of my invention is accomplished by scanning the successive elementary portions of the picture at a definite rate, transmitting groups of electric waves at a frequency proportional to the rate of scanning, modulating the amplitude of the successive wave groups in accordance with the light variations of the successive elementary portions of the picture transmitting the modulated wave groups to the receiving station over a suitable medium, receiving the wave groups, detecting the impulses to derive therefrom a current having a frequency equal to the group frequency and varying in amplitude in accordance with the light variations of the successive elementary portions of the picture, translating the low frequency current into light variations, projecting the light variations upon a receiving surface and distributing the light over the surface by means controlled by the low frequency current.

A further object of my invention is to provide novel means for maintaining synchronism between the scanning apparatus at the transmitting station and the light distributing apparatus at the receiving station.

With the above object in view my invention contemplates generating high frequency waves, modulating the high frequency by relatively low frequency modulations bearing a definite relation to the rate of scanning the pictures, transmitting the modulated high frequency waves to the receiving station, receiving and detecting the modulated high frequency waves to derive therefrom, low frequency currents, amplifying the low frequency currents, operating a synchronous motor by the low frequency currents, operating a synchronous device by the synchronous motor, and controlling the light distributor by the synchronous device to maintain synchronism between the transmitting and receiving stations. By the term synchronous motor I intend to include any device which may be operated in synchronism with the low frequency currents, such for example, as an electrically operated tuning fork driven by the low frequency current, a polarized relay operated by the low frequency currents, or a conventional rotary synchronous motor.

In accomplishing the foregoing object my invention also contemplates an arrangement in which the synchronous motor at the receiving station is maintained in operation by a local source of power and the synchronizing signals transmitted from the transmitting station are employed solely for the purpose of maintaining the motor in synchronism.

Still another object of my invention is to provide a system for automatically maintaining synchronism between the transmitting and the receiving stations even though the rate of scanning may vary over a wide range.

With the foregoing object in view my invention contemplates transmitting synchronizing signals from the transmitting station to the receiving station, the frequency of the signals bearing a definite relation to the rate of scanning, controlling the speed of the light distributor at the receiving station by a synchronous motor operated or controlled by the synchronizing signals, the synchronous motor being of a type which has no pronounced natural period of oscillation or rotation.

For the attainment of these objects and such further objects as may appear herein or be hereinafter pointed out, I make reference to the accompanying drawings, forming a part hereof by way of illustrating schematically my invention in which—

Figure 1:
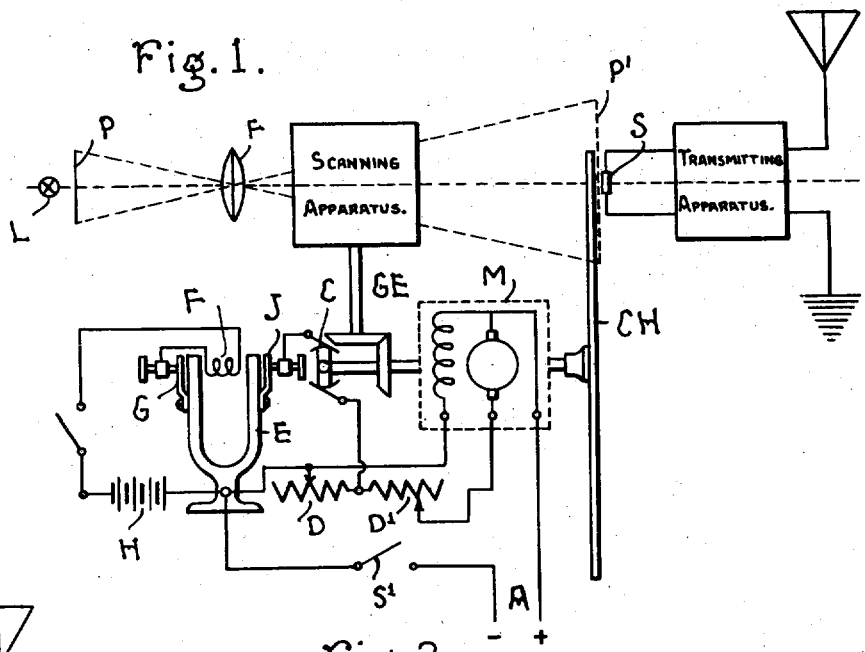
Figure 1 is a diagrammatical representation of the apparatus employed at the transmitting station.

Referring to Figure 1, L indicates a source of light illuminating a picture surface indicated at P. F indicates an optical system for forming an image P' in front of a light-sensitive cell indicated at S.

The cell S is arranged to modulate a transmitting apparatus, including an oscillation generator of well known construction, sending radio frequency waves varying in intensity and character in accordance with the visual representation to be transmitted. It will be observed that though I show the cell S energized by a light L projected upon the picture P, this is merely thus shown by way of example and for this purpose other means may be used to energize the cell and transmit signals in accordance with the light values of the object as for example as shown in my applications, Serial Number 35,118, filed June 5, 1925, Serial Number 40,839, filed July 1, 1925, and Patents Numbers 1,521,189, granted December 30th, 1924; 1,559,437, granted October 27th, 1925; 1,530,463, granted March 17th, 1925. Thus it will be observed that a systematic analysis of the object to be transmitted may be accomplished by a scanning device, and be converted to electrical impulses of corresponding values. It is also preferred particularly in connection with the apparatus shown to energize the light sensitive cell S in accordance with the light values of the object to be transmitted by including with the scanning device a light chopper CH. The combination of scanning apparatus and light chopper may be as shown in my Patent Number 1,525,549, granted February 10, 1925. A motor M is utilized to actuate the light chopper CH which motor also is preferably utilized to actuate the scanning apparatus by the gearing GE connected to the shaft of the motor so as to rotate in predetermined relationship. The speed of the motor and relationship of the scanning light-chopper CH being in cases where a moving object is to be transmitted, of a nature to show a single composite within persistence of vision in its various stages, in the nature of moving pictures. The light interruptions of the chopper disk CH are usually chosen with respect to the circumstances or conditions under which the apparatus is to be operated. For example, in transmitting picture messages between Omaha, Nebraska, and Iowa City, Iowa, the light was chopped one thousand times per second, a rate chosen to work best with amplifiers having a sharp peak at that frequency. The frequency of the light chopper is determined by the picture frequency factor, i. e., the frequency of the light interruptions must always be higher than the highest picture frequency.

It will be thus observed that the transmitting apparatus will emit a modulated radio wave in accordance with the light values of predetermined areas of the object whose image it is desired to transmit, and where I use a light chopper, the interruptions of light upon the light cell modulates the transmitted or carrier wave by low frequency signals, having utility in a manner which will herein appear as the description proceeds.

The motor M may be operated from any convenient source of power to maintain the same at a relatively constant speed. It is preferred however to insure substantially constant speed of rotation even under conditions involving factors such as change of load, momentum of moving parts, etc., and for this purpose I provide a control device which as shown in Figure 1 comprises a pair of mains A from a source of electric power supplying current for the motor M to produce the necessary rotation, C is a make-and-break device mounted on the motor shaft, D and D' are rheostats for regulating the speed of the motor M. E is a tuning fork having an inherent predetermined period of vibration and which is adapted to be maintained in vibration by the coil F, through the resilient contact G and the local source of power in the form of the battery H. The circuit may be completed through the resilient contact member J, across the make-and-break device C through the resistance $D^1$ which is in the circuit of the motor M. Means may further be employed to transmit the pulsations energizing the coil F in the manner described in my Patent Number 1,537,088 granted May 12, 1925.

In operation when the circuit is closed to supply current from the source A, the motor is caused to rotate at a speed desired for scanning or analyzing the visual object to be transmitted. Adjustment of speed is effected by the rheostats D and $D^1$ and is preferably such as to be a speed somewhat less than the natural period of vibration of the tuning fork E. With the contact G made and the tuning fork not in vibration the rotation of the armature of the motor M through the operation of the double break contact C, is not effected. When however the circuit involving the battery H is closed to energize the coil F and place the tuning fork in vibration, there results an opening and closing of the circuit through the contact J the make-and-break device C whenever the contacts at C and the contact J occur simultaneously. This condition shorts the resistance D or a predetermined portion thereof previously used to adjust the motor speed. With a shorting of the resistance there is a consequent increase in speed of the motor and as the contacts C are of appreciable size, the period of time of short circuiting of the resistance D will determine the proportion of boosting the motor will receive by the length of time of the short circuiting. Thus the greater the lag of the motor the more likelihood is there for a greater portion of the contacts C to be traversed and consequently the short circuiting period increased. With the contacts C ahead of the contact J the resistance D and $D^1$ is put into the circuit of the motor and as this has been adjusted to be below the desired motor speed, the speed of rotation, of the motor will be diminished.

Where no chopper CH is used with the scanning device every contact break at J may be used to transmit a low frequency signal or what that may be called a synchronizing signal in the manner described in my Patent Number 1,537,088, aforesaid, and if desired this signal may be transmitted with the low frequency wave to modulate or interrupt the transmitted signal representing light values. But in certain cases the low frequency modulation may be accomplished by the chopper CH and the low frequency signal so transmitted utilized for synchronizing purposes and accomplishing distant motor control in a manner which will hereinafter appear.

To reproduce the effect at the transmitting station at any desired distant point, there is provided suitable receiving apparatus in numbers as desired for reconverting the radio impulses to visual effects corresponding to those originally set up at P. For this purpose I provide a detector responding to the emitted signals and capable of faithfully reproducing the same, suitable amplifying apparatus arranged to step up the signals so detected to the required intensity and capable of illuminating the lamp $L^1$ by impulses corresponding in nature to that impinging on the cell S. A concentrating lens F' is preferably used to focus the rays of light upon a distributor adapted to direct the rays upon a recording surface P''. This surface may be a light sensitive film for reproducing a picture film or where the speed is such to give the effect of moving pictures, a rapidly moving film is used. Also the surface P' may be a screen, either opaque, translucent or phosphorescent by which direct visibility may be affected and where the object transmitted is one that is constantly changing, obtain the effect of moving pictures. In this connection the distributor may preferably be any one as shown in patents:—

Number 1,521,190, granted December 30, 1924; Number 1,521,191 granted December 30, 1924; Number 1,530,463, granted March 17, 1925; Number 1,544,156 granted January 30, 1925.

The distributor is arranged to be driven by suitable driving means at a speed corresponding to that of the original scanning apparatus so as to be in synchronism therewith. For this purpose the motor $M^1$ is arranged to rotate the distributor at such speed as to produce synchronism and for this it is preferred to have the transmitting station and the signals emitted thereby serve as a control for the motor $M^1$.

This control may be visual for purposes of starting the apparatus and maintaining the receiving apparatus in synchronism manually or may be combinations of visual control and automatic maintenance. Characteristic of such methods of control reference is made to my patents, Number 1,525,553, granted February 10, 1925; Number 1,537,088, granted May 12, 1925.

The distant motor may also be controlled by selection of parts which will give substantial synchronism, with the motor of the transmitting station and for this purpose the motor $M^1$ may have connected therewith a tuning fork $E^1$ serving to control the effect of the resistance D through the circuit breakers $G^1$ and $J^1$ and the contact breaking device $C^1$ in the same manner as described in Figure 1 by choosing the tuning fork to have the same inherent period of vibration as the tuning fork E. Under such conditions even though the current supply to the motor $M^1$ is from different systems the rotation of $M^1$ will correspond to that of the motor M. This method of control has particular utility where in the transmitting device no light chopper arrangement is used.

Figure 2:
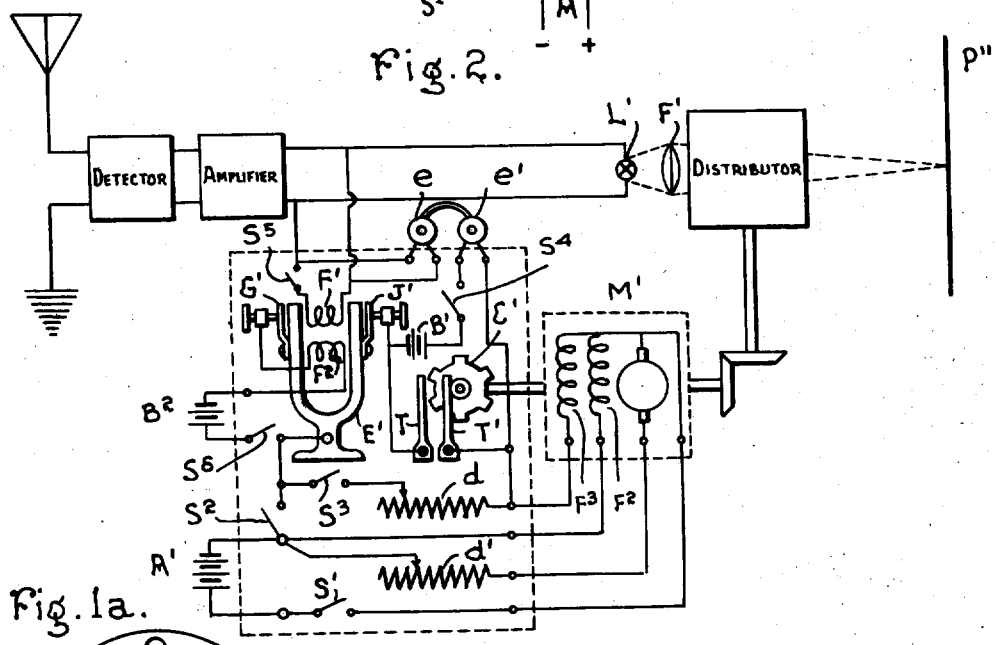
Figure 2 is a diagrammatical representation of one form of the apparatus employed at the receiving station.
Figure 1A:
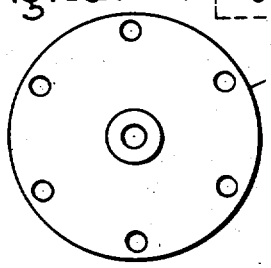
Figure 1A is a view showing the details of construction of a light chopper employed in Figure 1.
Figure 2A:
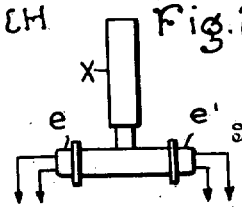
Figure 2A shows a modification of apparatus employed in Figure 2 for detecting the condition of synchronism.

The arrangement shown in Figure 2, comprises the following:

Motor $M^1$ is driven from a suitable source of current indicated at $A^1$, and may be started and stopped by switch $S^1$. The motor is provided with two field windings, one winding $F^2$ being so connected that it is directly across source $A^1$ when switch $S^1$ is closed, while the circuit of the other winding is completed along the following path:

Contact finger $T^1$ bearing on the hub of a conducting rotary contact making disc $C^1$ carried by the shaft of the motor; through the disc to contact finger T; to resilient contact $J^1$ carried by the tuning fork; through the tine of the tuning fork, and back to the source $A^1$ through switch $S^2$ when closed. If desired, the circuit of winding $F^3$ may be completed through a second path including adjustable resistance (*d*) and switches $S^3$ and $S^2$. An adjustable resistance ($d^1$) is included in the armature circuit for manually adjusting the speed of the motor. Connected across contact fingers T, $T^1$ is a local circuit including a battery $B^1$, a switch $S^4$ and one earpiece $e^1$ of a telephone head-set, the function of this local circuit being to produce in ear-piece $e^1$ a signal, the frequency of which is proportional to the speed of motor $M^1$. The other ear-piece (*e*) of the head-set is supplied with current from the amplifier of the receiving set. Tuning fork $E^1$ may, by closing switch $S^5$, be maintained in operation by current supplied from the receiving set to operating coil $F^1$. The fork may be maintained in operation independently of the receiving set by battery $B^2$ which is included in a serial circuit including a second operating coil $F^2$, resilient contact $G^1$ on the left tine of the fork, and switch $S^6$. It will be seen later that for certain purposes it is desirable to control the fork by the combined action of the local supply $B^2$ and current from the receiving set.

The operation of the arrangement, under the condition in which synchronism is maintained by manual adjustment of the speed of the motor, and the condition of synchronism is indicated by audible signals, is as follows:

With the apparatus in the condition as shown in the drawings, the motor is started by closing switch $S^1$. It is to be understood that suitable signals bearing a definite relation to the rate of scanning, are being received from the transmitting station and are audible in ear-piece (*e*). These synchronizing signals may be generated at the transmitting station by several different methods as pointed out in connection with the description of Figure 1, the preferred method, however, is to use a light-chopper for this purpose. Upon closing switch $S^4$ a signal will be audible in ear-piece ($e^1$) having a frequency proportional to the speed of motor $M^1$. The number of contact points on disc $C^1$ must be the same as the number of openings in the chopper disc CH if the drive ratio between motor M and the scanning device is the same as the drive ratio between motor $M^1$ and the distributor. It is obvious that this relation will not hold true in case the drive ratios are different. While I have shown the chopper disc in Figure $1^a$ as having six openings, and disc $C^1$ as having the same number of contact points, I may use any desired number and any desired ratio between the number of openings and the number of contact points. The distributor is brought into synchronism with the scanner by adjusting the speed of motor $M^1$ by manual adjustment of rheostat ($d^1$) until the signal produced in ear-piece ($e^1$) is of the same frequency as the signal heard in ear-piece ($e$). Under this condition the operator will appear to hear a single signal. However, if motor $M^1$ should either speed up or slow down for any cause, the frequency of the signal in ear-piece ($e^1$) will be changed correspondingly, and the operator will be able to detect the lack of synchronism by the difference in pitch of the two signals, and, if there is sufficient difference, he will also hear a beat note. The operator will restore synchronism by proper adjustment of rheostat ($d^1$).

To permit the operator more liberty of movement about his station, a resonant horn, X, to which the ear phone $e$ and $e^1$ are fastened, may be substituted for the head set. In this case when the motor at the receiving station is in exact step with the motor at the sending station, the phone $e$ and $e^1$ are in perfect unison, and, therefore, the sound from one amplifies the sound from the other, and a very loud sound is produced. When, however, the receiving station lags or accelerates with respect to the speed of the motor at the sending station, not only does the sound decrease in loudness, but two tones instead of one are detected, which immediately notifies the operator that his motor speed must be adjusted into synchronism with the sending station.

Another manner of operation in which synchronism is maintained without positive maintenance from the transmitting station is as follows:

With the apparatus in the condition as shown in the drawings, motor $M^1$ is started by closing switch $S^1$. Fork $E^1$ is started vibrating by closing switch $S^6$. The frequency of vibration of fork $E^1$ is equal to the product of the number of contacts on disc $C^1$ times the desired speed of rotation of motor $M^1$. The stationary screw-contact cooperating with resilient contact $J^1$ is so adjusted that contact is maintained for substantially one-half the period of oscillation. The width of each contact segment on disc $C^1$ is preferably equal to the space between adjacent segments. It is apparent that if motor $M^1$ is rotating at such speed that disc $C^1$ makes contact with contact finger T in synchronism with the vibration of fork $E^1$, and if the two contacts are made at the same instant of time, the circuit of field winding $F^3$ will be opened and closed (provided switch $S^2$ is closed) during each vibration of the fork $E^1$, and the "closed" period will be equal to the "open" period. The effect upon the motor of closing the circuit of winding $F^3$ will depend upon its relative direction of winding with respect to winding $F^2$. If it opposes winding $F^2$, the effect will be to weaken the field and tend to cause the motor to speed up; if it assists winding $F^2$, the effect will be to increase the field and a tendency to decrease the speed of the motor. It is obvious that the effectiveness of the control will depend upon the relative duration of the "closed" and "open" periods. Assuming that winding $F^3$ opposes winding $F^2$, rheostat ($d^1$) is adjusted until the speed of the motor is slightly lower than the desired speed. Disc $C^1$ will tend to lag behind the vibration of the fork, but the effect of periodically connecting in winding $F^3$ will be to arrest the lagging when the lag reaches a point at which the relative periods of "open" and "closed" condition of winding $F^3$ produces the desired offsetting tendency to speed up the motor. The motor will now run in synchronism with fork $E^1$. If the motor should tend to slow down for any cause, for example an increase in load, the motor will lag behind the fork and increase the "closed" period and decrease the "open" period, thereby rendering the action of winding $F^3$ more effective in maintaining the motor at synchronous speed. A test may be made for synchronism with the transmitting station by closing switch $S^4$ and comparing the audible signals as explained above. Adjustment of the speed of the motor to obtain synchronism with the distant station is made by adjusting the period of fork $E^1$ in any well known manner, as described in my U. S. Patent No. 1,537,088, granted May 12, 1925.

If winding $F^3$ assists winding $F^2$, rheostat ($d^1$) is adjusted until the motor tends to run slightly faster than the desired speed, and the effect of periodically connecting in winding $F^3$ will be to offset this tendency in a manner which will be apparent in view of the foregoing explanation.

Instead of completely opening and closing the circuit of winding $F^3$, if desired, the circuit may be normally completed through a suitable resistance ($d$) by closing switch $S^3$. The action of fork $E^1$ and disc $C^1$ will be to periodically short-circuit resistance ($d$), thereby resulting in the same action as before but giving a more delicate control.

Motor $M^1$ may be automatically maintained in synchronism with the transmitting station by driving tuning fork $E^1$ by current supplied from the receiving set by closing switch $S^5$. In this case the fork will vibrate in synchronism with the synchronizing signals, and it is not necessary to drive the fork from battery $B^2$. In getting motor $M^1$ synchronized with fork $E^1$, it is convenient to make use of the audible signals produced in the head set to get the proper initial speed. This may be done by first adjusting the speed of the motor until the audible signals indicate synchronism between the speed of the motor and the incoming signals, and then slightly increasing or decreasing the speed as required, depending upon whether coil $F^3$ asissts or opposes coil $F^2$ as explained above.

In order that the receiving set shall not be called upon to supply an undue amount of current for operating fork $E^1$, the fork may be maintained in operation by the local battery $B^2$, and the receiving set will supply only sufficient current to maintain synchronism and proper phase relationship. In such an arrangement all the operating losses, such as internal friction, and windage losses, will be supplied by the local source of power. It is obvious that a very small amount of current will be required to maintain the fork in synchronism, even though the period of the fork may be slightly off.

Figure 3:
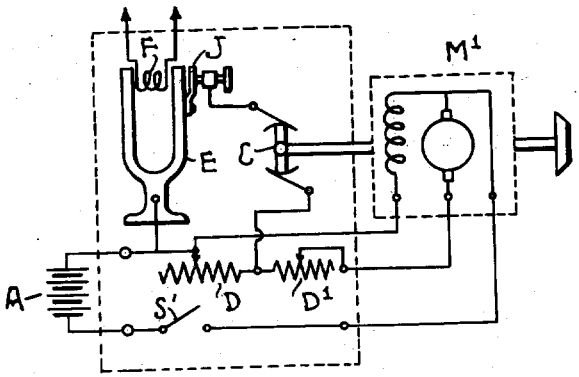
Figures 3, 4, 5 illustrate modified forms of apparatus employed in Figure 2 for the purpose of maintaining synchronism between the transmitting and receiving stations.

In Figure 3, is shown a modified arrangement for controlling the speed of motor $M^1$ to automatically maintain synchronism with the transmitting station. The arrangement is the same as the arrangement employed for controlling the speed of motor M in Figure 1, except that the fork E is operated by current from the receiving set instead of the local source of power. It is obvious that the fork will be operated in synchronism with the synchronizing signals, and the action of the fork in controlling the speed of motor $M^1$ is the same as in Figure 1. If desired, the fork may be maintained in operation by a local battery in a manner described above in connection with Figure 2.

Figure 4:
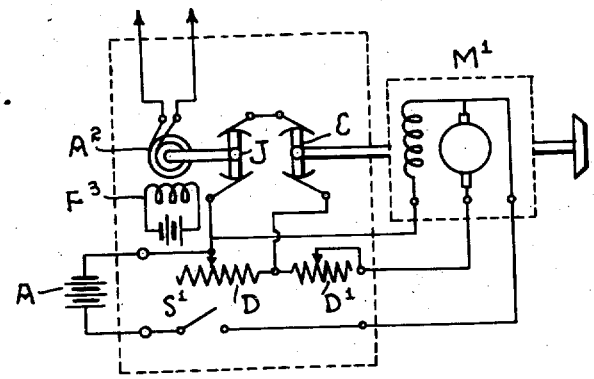

Instead of employing a tuning fork, which is essentially a synchronous motor having translating motion, for driving the periodic contact making device J in series with contact maker C, a rotary type of synchronous motor may be used as shown in Figure 4. In this case, the contact device J takes the form of a rotary commutator like that shown at C. While these devices are shown as having only two segments, it is obvious that only one or more than two may be used if desired. It is apparent that if the synchronizing current from the receiving set be supplied to the armature $A^2$ of the rotary synchronous motor, the field $F^3$ being energized by a suitable source of direct current, contact making device J will be rotated synchronously with the incoming signals, and the action of J in controlling the speed of the motor will be the same as in Figures 1 and 3. An advantage of the arrangement shown in Figure 4, is that the rotary type of synchronous motor has no natural period of vibration or rotation, as in the case of a tuning fork, and the motor will readily respond to changes in frequency of the synchronizing signals should the rate of scanning be changed for any reason. It is also obvious that the same advantage may be obtained by operating contact J in Figure 3 by a polarized relay having no pronounced natural period of vibration.

Figure 5:
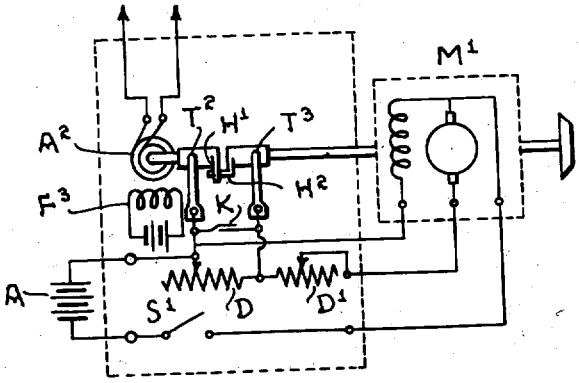

The arrangement shown in Figure 5, is the same as that of Figure 4, except for the details of the contact making devices for short-circuiting resistance D.

The shaft of motor $M^1$ carries an insulated dog $H^2$, and the shaft of armature $A^2$ carries a dog $H^1$ which extends into the path of rotation of dog $H^2$. Dogs $H^1$ and $H^2$ are connected respectively to the terminals of resistance D by means of brushes $T^2$ and $T^3$. A push-button K is arranged so that brushes $T^2$ and $T^3$ may be short-circuited. The remaining parts are the same as in Figure 4.

The operation of Figure 5 is as follows:

Motor $M^1$ is started by closing switch $S^1$, and as it rotates, dog $H^2$ will engage dog $H^1$ and cause armature $A^2$ of the rotary synchronous motor to rotate with motor $M^1$. Upon closing push button K motor $M^1$ will speed up, due to the short-circuiting of resistance D, and will drive the synchronous motor above synchronous speed. Upon releasing the button K, both motors will slow down, and as the synchronous motor falls to synchronous speed it will fall into step with the incoming signals, but motor $M^1$ will continue to slow down until dog $H^2$ comes in contact with dog $H^1$ and short-circuits resistance D. Short-circuiting resistance D causes the motor to increase in speed momentarily until contact between the dogs is broken, then motor $M^1$ lags until contact is made again. This cycle of operation is repeated at rapid intervals with the result that it is not possible to detect any unsteadiness in the rotation of motor $M^1$. The foregoing arrangement is described and claimed in my copending application Ser. No. 727,271, filed July 21, 1924.

Though I have described in certain preferred embodiments the transmission of radio frequency emanations or impulses representing light values as modified by the scanning apparatus to obtain low frequency modulation suitable for transmitting a synchronizing signal, it is considered that in certain phases of my apparatus the effect produced is characteristic of interruption of transmission to obtain "key control" of signals either for transmission of light values and/or for purposes of indicating aurally or visually synchronism; or indicating aurally or visually and manually controlling synchronism; or aurally or visually indicating synchronism and automatically maintaining and controlling the same, or automatically maintaining synchronism.

It will thus be observed that I have described a system of transmission of visual representations either still or constantly changing as obtained from an object, a graphic representation including pictures, printed matter and the like and for reproducing the same at a distance faithfully involving apparatus for recomposing the transmitted impulses representing the original visual representation and means for controlling the recomposing apparatus to be in synchronism with the transmitting device.

Having thus described my invention and illustrated the same, what I claim is:—

1. The method of transmitting and receiving pictures which comprises, scanning the successive elementary areas of the picture to produce light variations, interrupting the light variations at a rate proportional to the rate of scanning to produce a synchronizing signal, modulating a carrier current in accordance with said interrupted light variations, transmitting the modulated current to a receiving station, causing a light distributor to traverse a picture receiving surface at a rate proportional to the rate of interruption of the light variations, modulating the light of the distributor in accordance therewith, generating at the receiving station a synchronizing signal of audio frequency bearing a definite relation to the light distributor, and transmitting the two synchronizing signals to a single sound producing instrument.

2. The method of transmitting and receiving pictures, which comprises, scanning the succesive elementary areas of the picture to produce light variations, interrupting the carrier current at a rate proportional to the rate of scanning to produce a synchronizing signal, modulating a carrier current in accordance with the interrupted light variations, transmitting the modulated current to a receiving station, causing a light distributor to traverse a picture receiving surface at a rate proportional to the rate of interruption of the carrier current, modulating the light of the distributor in accordance therewith, generating at the receiving station a synchronizing signal of a frequency bearing a definite relation to the light distributor, transmitting the two synchronizing signals to acoustic responsive means, and manually synchronizing the distributor with the scanning means.

3. The combination of a transmitting station, means at said station for transmitting a synchronizing wave, a receiving station, a motor at said receiving station, a resistance in series with said motor, a contact making device on the shaft of said motor, a vibrating contact making device, means for keeping the same in constant vibration by the synchronizing wave from said transmitting station, and means for changing the motor resistance responsive to the conjoint action of the contact making devices, manually operable means for controlling the electric motor, means for generating a synchronizing signal at the distant station, and means for generating a second swnchronizing signal bearing a definite relation to the speed of the motor for comparison with the first mentioned synchronizing signal.

4. In a system of the character described, means for producing image currents having an inherent frequency component determined by the speed of a transmitting analyzer, a receiving image synthesizer, and means for audibly comparing the speed of the synthesizer with the transmitting analyzer.

5. In a system of the character described the method which comprises transmitting a current having a characteristic frequency note determined by the speed of a transmitting analyzer, receiving said current, generating a current at the receiver having a characteristic note determined by the speed of a receiving synthesizer, and audibly comparing the frequencies of said notes to detect lack of synchronism between the analyzer and synthesizer.

CHARLES FRANCIS JENKINS.